United States Patent
Balogh et al.

(10) Patent No.: US 7,366,518 B2
(45) Date of Patent: Apr. 29, 2008

(54) SUPPLEMENTAL CHANNEL SHARING ALGORITHM

(75) Inventors: Dan Anthony Balogh, Madison, NJ (US); John K Burgess, Morristown, NJ (US); T Roger Kiang, Basking Ridge, NJ (US); Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 476 days.

(21) Appl. No.: 09/728,043

(22) Filed: Dec. 1, 2000

(65) Prior Publication Data

US 2002/0068577 A1    Jun. 6, 2002

(51) Int. Cl.
*H04Q 7/20* (2006.01)
(52) U.S. Cl. ............... 455/450; 455/464; 370/329; 370/341; 370/348
(58) Field of Classification Search ........... 455/450, 455/464, 509, 179.1, 309; 370/329, 342, 370/335, 441, 332, 330, 348, 368, 341; 709/227, 709/228, 229; 375/260, 337; 379/240, 265.1, 379/265.11
See application file for complete search history.

(56) References Cited

U.S. PATENT DOCUMENTS

| | | | | |
|---|---|---|---|---|
| 5,261,118 A | * | 11/1993 | Vanderspool et al. | 455/503 |
| 5,613,196 A | * | 3/1997 | Barnes et al. | 455/15 |
| 5,802,465 A | * | 9/1998 | Hamalainen et al. | 455/403 |
| 6,097,717 A | * | 8/2000 | Turina et al. | 370/348 |
| 6,144,856 A | * | 11/2000 | Ko | 455/436 |
| 6,173,007 B1 | * | 1/2001 | Odenwalder et al. | 375/146 |
| 6,208,865 B1 | * | 3/2001 | Veerasamy | 455/450 |
| 6,418,148 B1 | * | 7/2002 | Kumar et al. | 370/468 |
| 6,591,107 B1 | * | 7/2003 | Sonetaka | 455/450 |

* cited by examiner

*Primary Examiner*—Nghi H. Ly
(74) *Attorney, Agent, or Firm*—John B. MacIntyre

(57) ABSTRACT

Disclosed is a method for utilizing SCH resources more efficiently for supplemental channels (SCH) by minimizing gaps between data bursts due to overhead delays. Such gaps are minimized using a supplemental channel sharing algorithm to prospectively assign SCH resources supporting existing SCHs and to schedule future issuance of DNRs such that currently unavailable SCH resources may be prospectively assigned based on states of the SCH resources, wherein an existing SCH is a SCH over which a data burst is currently being transmitted.

10 Claims, 9 Drawing Sheets

100

80

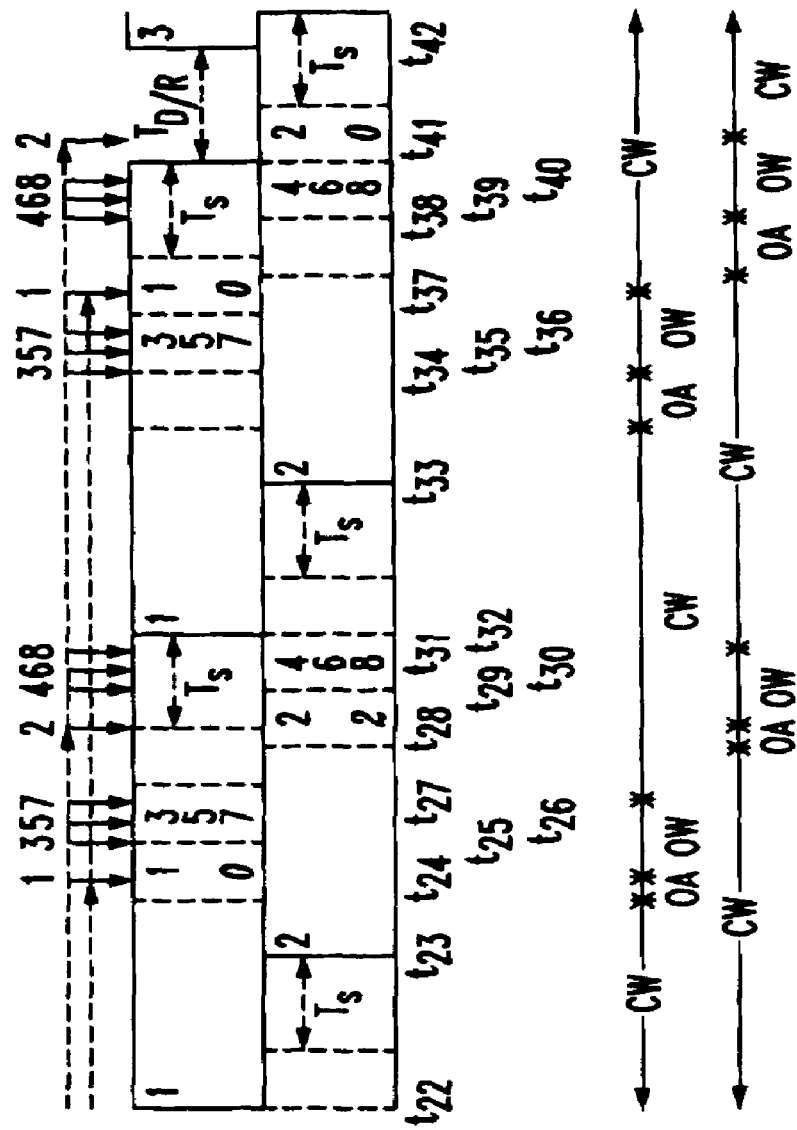
FIG. 8 continued (a)

SUPPLEMENTAL CHANNEL SHARING ALGORITHM

FIELD OF THE INVENTION

The present invention relates generally to wireless communication systems and, in particular, to high speed packet data transmission over wireless communication systems.

BACKGROUND OF THE RELATED ART

FIG. 1 depicts a wireless communication system 10 in accordance with the prior art. Wireless communication systems 10 comprises a base station 12, a digital cellular switch (DCS) 14, and a plurality of mobile-telephones 16 and 18 associated with users. Base station 12 utilizes resources, such as radio frequency (RF) bandwidth, channel element (CE) resources, Walsh codes and packet pipe (PP) bandwidth, to support fundamental channels (FCH) and supplemental channels (SCH) in the forward direction over which data may be transmitted to mobile-telephones 16 and 18. Base station 12 typically having sufficient resources to support multiple FCHs and SCHs. The resources supporting a particular FCH, also referred to herein as fundamental channel or FCH resources, are dedicated to the mobile-telephone to which base station 12 is in communication over that FCH. By contrast, the resources supporting a particular SCH, also referred to herein as supplemental channel or SCH resources, may also be supporting other SCHs, but not concurrently. Typically, SCH resources are all remaining resources belonging to base station 12 which are not supporting FCHs, i.e., all resources minus FCH resources. Some or all SCH resources may be used to support a SCH depending on the needs associated with the user of the SCH.

In the prior art, data is transmitted either over the FCH or SCH depending on the amount of data to be transmitted and availability of SCH resources. Specifically, if the amount of data for a user exceeds a data threshold and SCH resources are currently available to support a SCH for that user, the data is transmitted over a SCH, wherein the data threshold, for example, is an amount exceeding a data transmission capacity associated with the FCH of the user. Otherwise, the data is transmitted over the FCH associated with the user. Note that the manner in which a determination is made regarding whether there are sufficient SCH resources currently available to support a SCH for a particular user depends on factors such as maximum data rate of user, data backlog for user, available CE, RF, Walsh codes and PP resources, as is well-known in the art.

Data to be transmitted to mobile-telephones 16 and/or 18 is received by DCS 14 and subsequently routed to base station 12 for transmission to mobile-telephone 16 and/or 18. The following routing protocol is used for routing data from DCS 14 to base station 12. If the data to be transmitted does not exceed the data threshold, DCS 14 routes the data to base station 12 for transmission over the FCH of the user to which the data is intended. If the amount of data to be transmitted to a particular mobile-telephone exceeds the data threshold, DCS 14 checks for current SCH resource availability by issuing a data notify request (DNR) to base station 12, wherein the data notify request indicates a resource request for a SCH and the amount of data to be transmitted.

Upon receipt of the data notify request, base station 12 determines whether it has SCH resources currently available to support a SCH for that user. If base station 12 determines it currently has such SCH resources available, base station 12 assigns the currently available SCH resources to the user, sets up a SCH utilizing the currently available SCH resources, and responds with an approval indicating when DCS 14 should begin routing the data to base station 12, i.e., after the SCH has been set up. Upon receipt of the approval, DCS 14 begins routing the data to base station 12 at the time indicated in the approval for transmission over the SCH.

If base station 12 determines there are no currently available SCH resources to support a SCH for the user, base station 12 responds with a denial indicating to DCS 14 not to route the data to base station 12. Upon receipt of the denial, DCS 14 delays a waiting period or predetermined time interval, e.g., half a second, before issuing another data notify request if, at the end of waiting period, DCS 14 still has data for the same user over the data threshold. Note that during the waiting period, DCS 14 may be routing all or some of the it has for the user for transmission over the FCH of the user. Thus, it is possible that at the end of the waiting period, DCS 14 may not have data for the user over the data threshold.

The above described routing protocol can cause overhead delays which, in turn, result in gaps between data bursts. FIG. 2 depicts a time chart 20 illustrating, for example, shared SCH resources 21 supporting one SCH at a time. During time intervals $t_0$ to $t_1$ and $t_4$ to $t_5$, SCH resources 21 are supporting a SCH for mobile-telephone 16 over which data bursts 22 and 26 are being transmitted. Similarly, during time interval $t_2$ to $t_3$, SCH resources 21 are supporting a SCH for mobile-telephone 18 over which data burst 24 is being transmitted. During time intervals $t_1$ to $t_2$ and $t_3$ to $t_4$, gaps 28 and 30 exist during which SCH resources 21 are not utilized.

Gaps 28 and 30 may be caused by overhead delays associated with the routing protocol, among other reasons. For example, suppose DCS 14 has data for mobile-telephone 18 which exceeds the data threshold. At time $t_6$, DCS 14 issues a data notify request for mobile-telephone 18. At this time, base station 12 is utilizing SCH resources 21 to support a SCH for mobile-station 16 in the transmission of data burst 22 and does not currently have any other SCH resources available to support a SCH for mobile-telephone 18. Accordingly, base station 12 responds to DCS 14 with a denial of the data notify request. DCS 14 waits the duration of the waiting period, i.e., $t_6$ to $t_7$. At the end of the waiting period, DCS 14 still has data for mobile-telephone 18 which exceeds the data threshold. Accordingly, at time $t_7$, DCS 14 issues a data notify request for mobile-telephone 18. At this time, SCH resources 21 are now available and can be used to support a SCH for mobile-telephone 18. Thus, base station 12 assigns SCH resources 21 to mobile-telephone 18, sets up a SCH using SCH resources 21 and responds with an approval for DCS 14 to begin routing the data to base station 12 at time $t_2$, wherein the time period between times $t_7$ and $t_2$ corresponds to a time period for setting up the SCH for mobile-telephone 18.

In this example, time periods $t_1$ to $t_7$ and $t_7$ to $t_2$ are caused by overhead delays, and collectively form gap 28. The time period $t_1$ to $t_7$ being caused by DCS 14 delaying the waiting period, and the time period $t_7$ to $t_2$ being caused by the setting up of the SCH for mobile-telephone 18 using SCH resources 21. Gaps resulting from overhead delays are undesirable because they result in the inefficient utilization of SCH resources. Accordingly, there exists a need for a more efficient utilization of SCH resources.

SUMMARY OF THE PRESENT INVENTION

The present invention is a method for utilizing SCH resources more efficiently for supplemental channels (SCH)

by minimizing gaps between data bursts due to overhead delays. Such gaps are minimized using a supplemental channel sharing algorithm to prospectively assign SCH resources supporting existing SCHs and to schedule future issuance of DNRs such that currently unavailable SCH resources may be prospectively assigned based on states of the SCH resources, wherein an existing SCH is a SCH over which a data burst is currently being transmitted. In one embodiment, the present invention is a method of sharing supplemental channel resources comprising the steps of receiving a data notify request, and prospectively assigning currently unavailable supplemental channel resources to support a future supplemental channel for a user associated with the received data notify request if the data notified request was received during an open assignment state, wherein a future SCH is a SCH supported by SCH resources which are either currently unavailable or has been prospectively assigned.

BRIEF DESCRIPTION OF THE DRAWINGS

The features, aspects, and advantages of the present invention will become better understood with regard to the following description, appended claims, and accompanying drawings where:

DETAILED DESCRIPTION

The present invention is a method for utilizing SCH resources more efficiently for supplemental channels (SCH) by minimizing gaps between data bursts due to overhead delays. Such gaps are minimized using a supplemental channel sharing algorithm to prospectively assign SCH resources supporting existing SCHs, i.e., currently unavailable SCH resources, to support future SCHs, and to schedule future issuance of DNRs such that currently unavailable SCH resources may be prospectively assigned, wherein an existing SCH is a SCH over which a data burst is currently being transmitted and a future SCH is a SCH supported by SCH resources which are either currently unavailable or has been prospectively assigned. Prospectively assigning currently unavailable SCH resources and scheduling future issuance of DNRs for prospective assignment purposes minimize gaps caused by overhead delays associated with SCH set up times and waiting periods.

The supplemental channel sharing algorithm of the present invention utilizes request windows and response states to prospectively assign currently unavailable SCH resources and to schedule future issuance of DNRs. The detailed description section will start with a description of the request windows and response states, followed by a description of the supplemental channel sharing algorithm and examples illustrating application of the supplemental channel sharing algorithm.

Request windows are time intervals associated with SCH resources in which base station 12 may schedule DCS 14 to issue future DNRs for users. The request windows are non-overlapping windows of a same or different fixed size. The duration of the request windows being specified as tunable parameters.

Response states are states or conditions associated with SCH resources relating to manners of responding to data notify requests, such as prospectively assigning the currently unavailable SCH resources and scheduling future issuance of DNRs. The response states are non-overlapping windows of variable size. The duration of the response states being dependent upon occurrence of certain events, as will be described herein.

Figure 1:
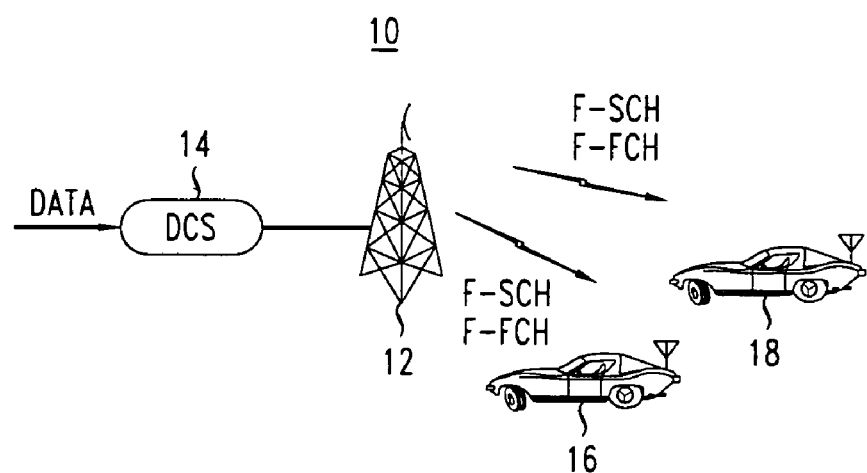
FIG. 1 depicts a wireless communication system in accordance with the prior art.
Figure 2:
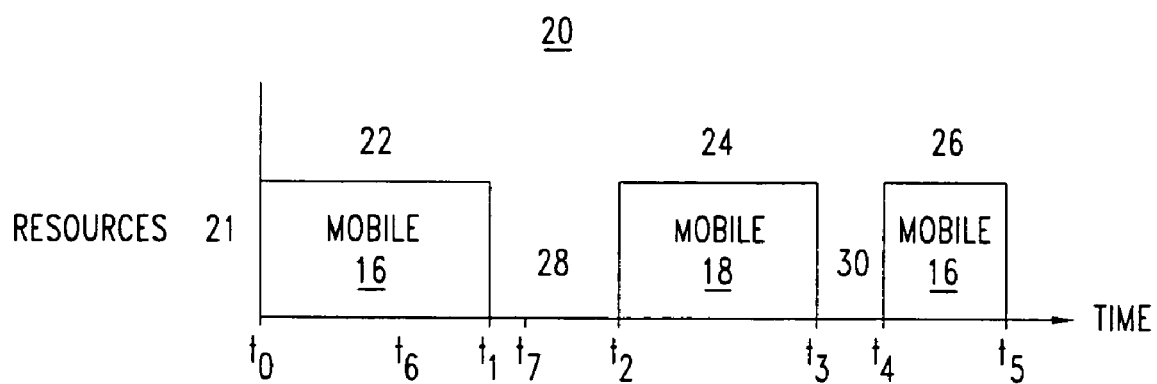
FIG. 2 depicts a time chart illustrating, shared SCH resources supporting one SCH at a time.
Figure 3:
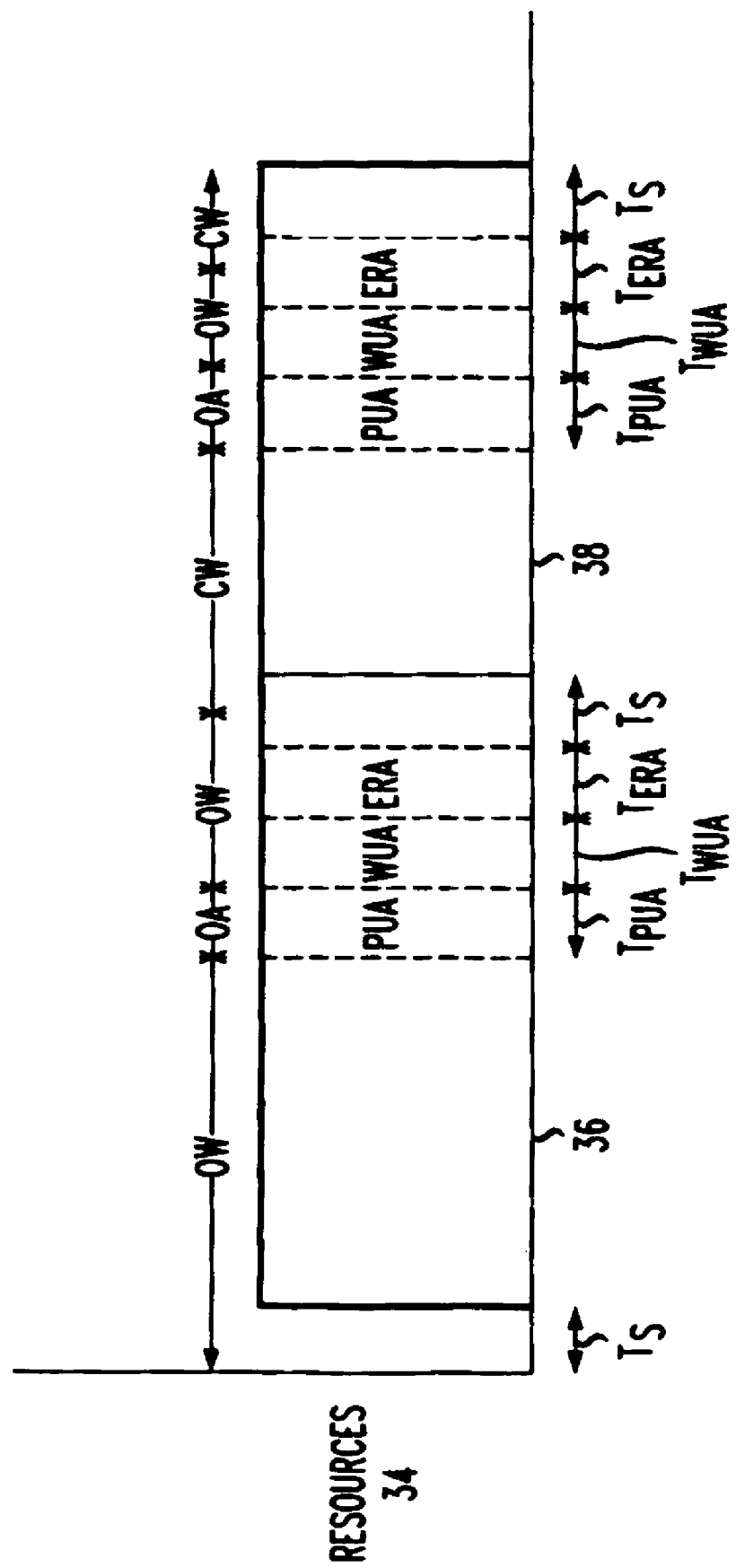
FIG. 3 depicts a time chart illustrating the relationship between request windows and response states with respect to SCH resources supporting SCHs over which two separate data bursts are transmitted.

In one embodiment, the present invention utilizes three types of request windows and three types of response states. The three types of request windows being a preferred user assignment (PUA) window, a waiting user assignment (WUA) window and an expired reassignment (ERA) window. The three types of response states being an open assignment (OA) state, an open waiting (OW) state and a closed waiting (CW) state. FIG. 3 depicts a time chart 32 illustrating the relationship between request windows and response states with respect to SCH resources 34 supporting SCHs 36, 38 over which two separate data bursts are transmitted, wherein SCHs 36, 38 may be a same SCH or different SCHs, i.e., SCHs associated with a same user or different users.

For each SCH 36, 38 currently supported or to be supported by SCH resources 34, there exists an associated set of request windows. The request windows are preferably positioned to end at least a time $T_s$ prior to the termination of the data bursts over SCHs 36, 38, wherein the time $T_s$ corresponds to a minimum time required by base station 12 to set up a future SCH when there is no contention for SCH resources between the existing SCH, e.g. SCH 36, and the future SCH, e.g., SCH 38. The duration of a data burst over a SCH being a determinable time based on the amount of data to be transmitted over the SCH and a data rate at which the data will be transmitted.

The first request window is the PUA window, followed by the WUA window and the ERA window. The PUA, WUA and ERA windows spanning duration $T_{PUA}$, $T_{WUA}$ and $T_{ERA}$. The PUA window starts no later than the time $T_s$ plus the sum of the duration $T_{PUA}$, $T_{WUA}$ and $T_{ERA}$. The WUA window starts no later than the time $T_s$ plus the sum of the duration $T_{WUA}$ and $T_{ERA}$. The ERA window starts no later than a time $T_s$ plus the duration of $T_{ERA}$. Note that the request windows may or may not be positioned adjacent to each other despite the depiction in FIG. 3.

The particular request window in which base station 12 schedules future issuance of DNRs depends upon the users associated with the future DNRs. In one embodiment, there are three types of users: current users, waiting users and random users. Current users are users with existing SCHs. Current users are given priority to a re-assignments or continuations of the SCH resources supporting their existing SCHs unless the current users have exceeded a continuation threshold, wherein a re-assignment or continuation is an assignment of SCH resources to support a future SCH for a user with an existing SCH supported by the same SCH resources, and a continuation threshold is a maximum number of allowable re-assignments or continuations for a user.

Base station 12 schedules DCS 14 to issue a current user DNR during the next PUA window of the SCH resources assigned to the current user if the continuation threshold has not been exceeded, wherein a current user DNR is the next DNR to be issued for the current user. Otherwise, base station 12 schedules DCS 14 to issue the current user DNR during the next ERA windows of the SCH resources assigned to the current user. For example, suppose at some time prior to the PUA window of SCH 36, the user of SCH 36 has more data over the data threshold to transmit. If the continuation threshold has not been exceeded, the current user DNR would be issued in the PUA window of SCH 36. If the continuation threshold has been exceeded, the current user DNR would be issued in the ERA window of SCH 36. Note that if a current user does not have data over the data threshold at the time DCS 14 is scheduled to issue a current user DNR for that user, no current user DNR is issued and the current user becomes a random user.

Waiting users are users associated with data notify requests issued by DCS 14 (and received by base station 12) during OW states but were denied assignment of any SCH resources. For ease of discussion, DNRs issued by DCS 14 and data routed to base station 12 by DCS 14 are assumed to be simultaneously received and transmitted by base station 12, respectively. This should not be construed to limit the present invention in any manner.

Base station 12 schedules DCS 14 to issue a waiting user DNR during the next WUA window of the SCH resources associated with the OW state in which the DNR was received or different SCH resources, wherein a waiting user DNR is the next DNR to be issued for the waiting user. Note that if a waiting user does not have data over the data threshold at the time DCS 14 is scheduled to issue the waiting user DNR for that user, no waiting user DNR is issued and the waiting user becomes a random user. In one embodiment, the particular WUA window in which a waiting user DNR is scheduled to be issued depends on waiting user counts of the next WUA windows for all SCH resources, i.e., SCH resources supporting an existing SCH or SCH resources prospectively assigned to support a future SCH, wherein a waiting user count indicates the number of waiting user DNRs scheduled to be issued in the associated WUA window. In this embodiment, the goal is to achieve an even distribution of waiting users among the SCH resources. For example, suppose there are SCH resources supporting two separate SCHs. If the waiting user counts associated with the WUA windows for the separate SCH resources are 1 and 0, the waiting user DNR would be issued in the WUA window associated with the waiting user count of 0.

Random users are all other users who are not current users nor waiting users, such as new users and users associated with DNRs issued in the CW state.

As mentioned earlier, the manner in which base station 12 responds to DNRs depends on the response states in which the DNRs were received. The goal of the response states of the present invention is to schedule DNRs to be issued in the request windows such that currently unavailable SCH resources may be prospectively assigned sufficiently in advance in order to begin or complete set up of a future SCH using the currently unavailable SCH resources by the time such SCH resources become available, thereby eliminating or reducing overhead delays associated with waiting periods. Recall that the request windows are positioned to end at least a time $T_s$ prior to the termination of the data burst being transmitted or to be transmitted over the associated SCH. The response states are configured relative to the request windows such that priority to SCH resources are given to users associated with DNRs received in the PUA window before those received in the WUA and ERA windows, and to those received in the WUA window before those received in the ERA window.

The OA state starts coincident with the beginning of the PUA window and corresponds to a state in which the SCH resources supporting an existing SCH are available for future or prospective assignment. Prospective assignment involves assigning currently unavailable SCH resources to a same or different user (of the currently unavailable SCH resources) to support a future SCH. Prospective assignment of currently unavailable SCH resources makes it possible to begin or complete SCH set up using the currently unavailable SCH resources prior to when the currently unavailable SCH resources becomes available, thereby eliminating or reducing the gaps between data bursts caused by SCH set up.

Currently unavailable SCH resources are available for prospective assignment only during the OA state. Responses to DNRs received during the OA state are approvals indicating when DCS 14 should begin to route data to base station 12 for transmission of the data over SCHs supported by the associated SCH resources and indications when to issue current user DNRs.

The OA state terminates when a data notify request is received during the OA state and the associated SCH resources have been prospectively assigned to the user of the received data notify request. The OA state may also terminate coincident with the end of the data burst if, before the end of the data burst, no data notify request was received and the SCH resources were not prospectively assigned. In an alternate embodiment, the OA state may terminate at the end of the ERA window. In such embodiment, the standard for determining whether SCH resources are currently available or unavailable would be based on the look-ahead time $T_s$. That is, to determine current availability of SCH resources, you look at the SCH resources at time $T_s$ in the future.

The beginning of the OW state is either coincident with the end of the OA state or with the assignment of SCH resources which were currently available. The OW state corresponds to a state in which the SCH resources supporting an existing SCH are not available for prospective assignment but waiting user DNRs may be scheduled to be issued in the next WUA windows of the SCH resources. Responses to DNRs received during the OW state are denials indicating when in the next WUA windows DCS 14 should issue waiting user DNRs, if any.

The duration of the OW state corresponds to the waiting user count associated with the SCH resources. The waiting user count being initialized to 0 when the OW state begins. For each waiting user data notify request scheduled to be issued in a WUA window, the waiting user count associated with that WUA window is incremented by one. When the waiting user count meets or exceeds a waiting user threshold, the OW state terminates. The waiting user threshold being a tunable parameter corresponding to a maximum number of allowable waiting user DNRs scheduled to be issued in a WUA window. In no event shall the OW state not terminate by the beginning of the next PUA window.

The CW state begins when the OW state ends unless the end of the OW state is coincident with the beginning of the PUA window. The CW state corresponds to a state in which the SCH resources supporting an existing SCH have been prospectively assigned and no other waiting user DNRs will be scheduled for issuance in the associated next WUA window. Responses to DNRs received during the CW state are denials. Such denials may indicate a time in the distant future, e.g., some time after termination of the future SCH, at which DCS 14 may issue the next DNR for the same user, if any. The CW state terminates when the OA state begins, i.e., at the beginning of the PUA window or when the SCH resources are no longer being utilized for an existing SCH or prospectively assigned to support a future SCH.

Figure 4:
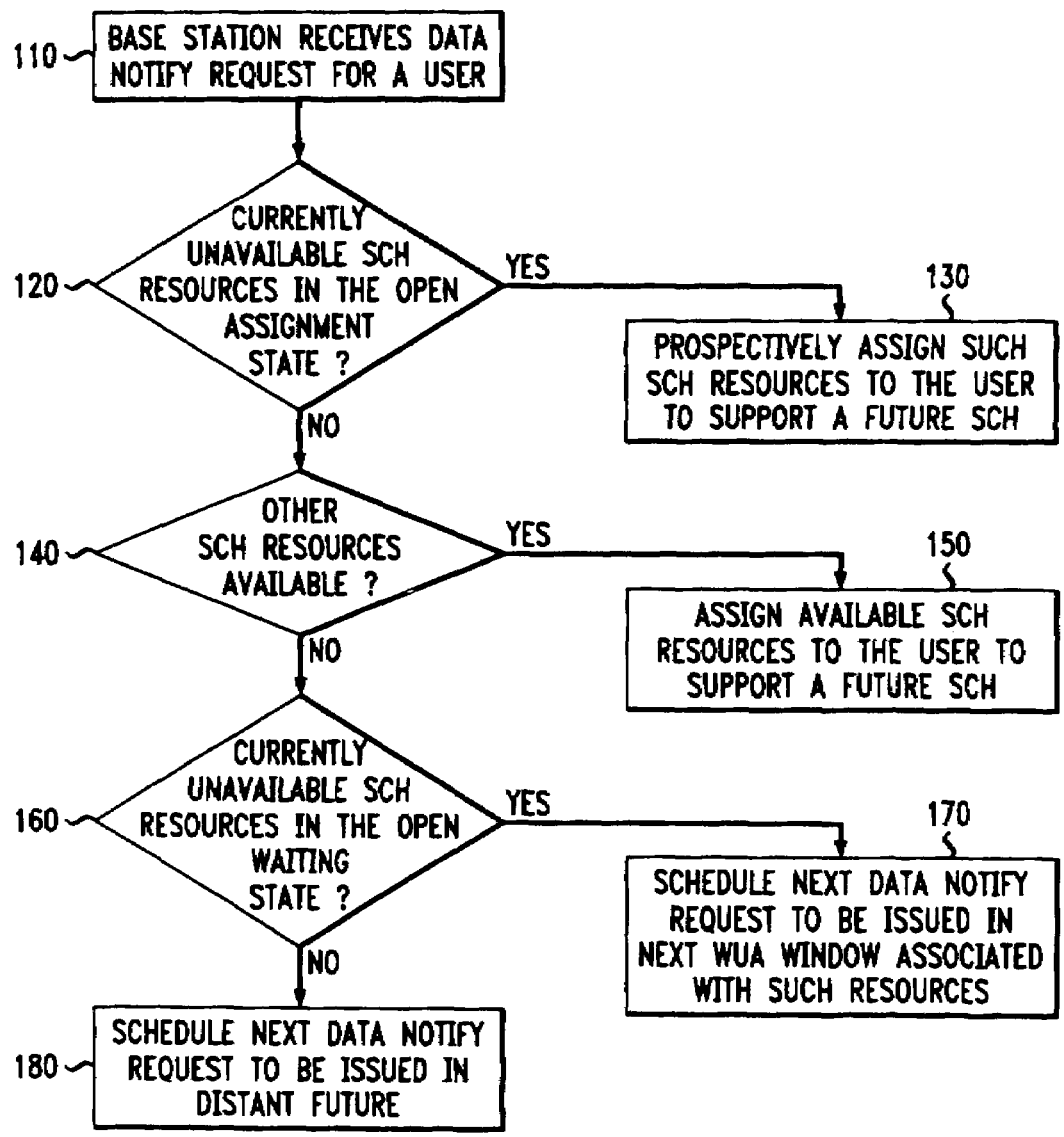
FIG. 4 depicts a flow chart illustrating a supplemental sharing algorithm using the request windows and response states in accordance with the present invention.

FIG. 4 depicts a flow chart 100 illustrating a supplemental sharing algorithm using the request windows and response states in accordance with the present invention. In step 110, base station 12 receives from DCS 14 a data notify request for a user. In step 120, base station 12 determines whether any SCH resources supporting an existing SCH is in the OA state. If there are such SCH resources in the OA state, in step 130, base station 12 prospectively assigns these SCH resources to the user associated with the received DNR. Upon completion of step 130, the prospectively assigned SCH resources goes from the OA state to the OW state. Note that before any SCH resources can be assigned to any user, regardless of the current response state or the current availability of the SCH resources, the SCH resources must be capable of supporting the minimum data rate for the user. If the SCH resources can not support the minimum data rate for the user, the SCH resources will not be assigned.

Note that there may be multiple SCH resources in the OA state, i.e., the SCH resources supporting multiple existing SCHs in the OA state. In one embodiment, when there are multiple existing SCHs, base station 12 prospectively assigns the user to the SCH resources supporting the oldest existing SCH, i.e. supplemental channel which have been in existence the longest time, or associated with the oldest OW state.

Figure 5:
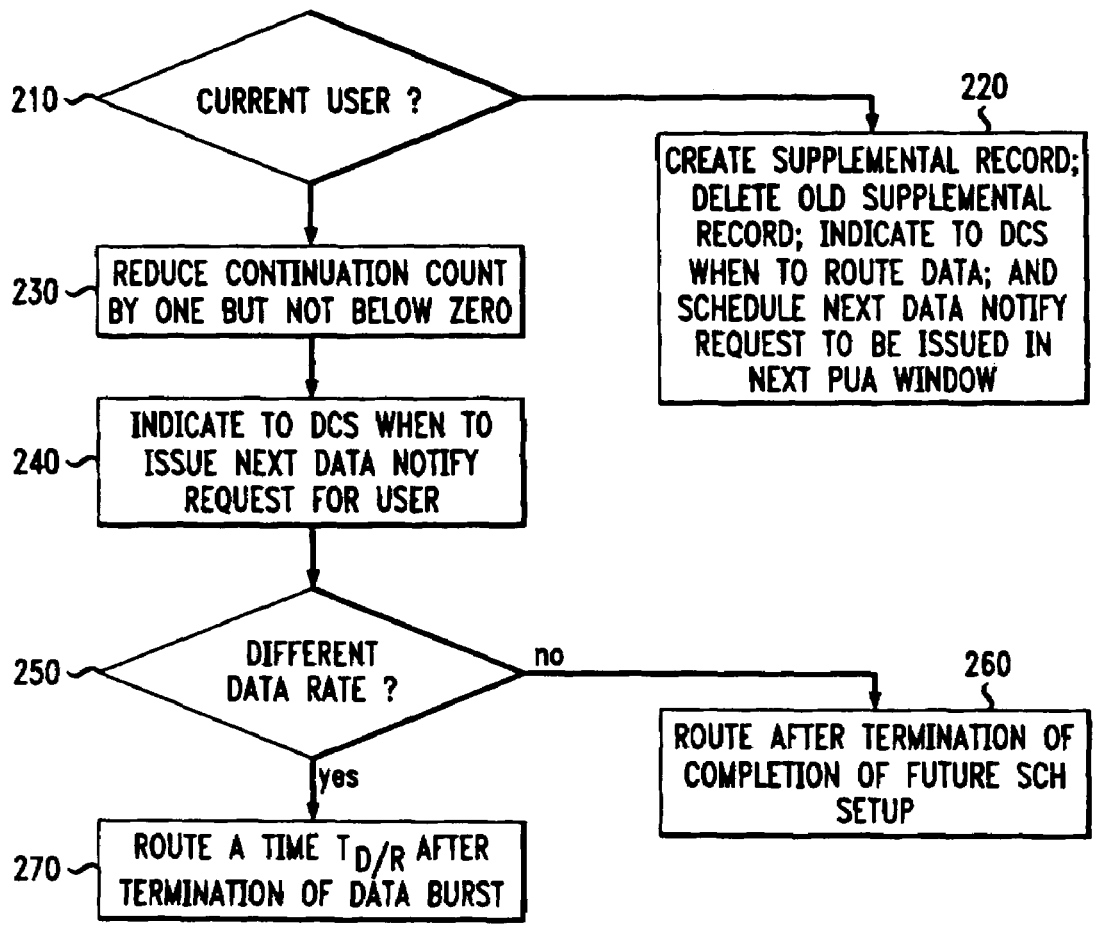
FIG. 5 depicts a flow chart illustrating a prospective assignment algorithm in accordance with one embodiment of the present invention.

In one embodiment, the prospective assignment of SCH resources in step 130 is executed in accordance with flowchart 200 depicted in FIG. 5. In step 210, base station 12 determines whether the user associated with the received DNR is a current user. If the user is not the current user of the SCH resources supporting the existing SCH in the OA state, in step 220, any previous supplemental record for the SCH resources is deleted, a new supplemental record is created for the SCH resources, DCS 14 is directed to begin routing the data for the user to base station 12 after the SCH resources become available (i.e., upon completion of the current data burst over existing SCH) and a new SCH can be set up, and DCS 14 is directed to issue a current user DNR, if any, in the next PUA window associated with the SCH resources. In one embodiment, if there is no contention for the SCH resources between the existing SCH and the SCH to be set up, DCS 14 is directed to begin routing the data for the user immediately upon completion of the setting up of the future SCH. If there is contention, then DCS 14 is directed to begin routing the data a time $T_{D/R}$ after the termination of the data burst, wherein the time $T_{D/R}$ corresponds to a minimum amount of time necessary to set up a SCH when there exists contention for the SCH resources between the existing SCH and the SCH to be set up. The time $T_{D/R}$ including a time for deactivating the existing SCH and setting up the new SCH.

The supplemental record is a record associated with the SCH resources, and includes a continuation count indicating a number of allowable re-assignments or continuations of the SCH resources for the current user, a data rate at which data is to be transmitted using the SCH resources, a waiting user count, and/or a time when the supplemental record was created. When the supplemental record is created, the continuation count is set to a maximum number of allowable re-assignments and the waiting user count is initialized to zero. The maximum number of re-assignments being a tunable parameter.

If base station 12 determines that the user is a current user, in step 230, the continuation count is reduced by one but not below zero. In step 240, base station 12 indicates to DCS 14 when to issue the current user DNR, if any. If the continuation count is greater than zero, DCS 14 is directed to issue the current user DNR during the next PUA window associated with the SCH resources. If the continuation count is zero, DCS 14 is directed to issue the current user DNR during the next ERA window associated with the SCH resources.

In step 250, base station 12 determines if the data rate for the future SCH is different from the data rate for the existing SCH, as indicated in the supplemental record. If there is no difference in data rates, in step 260, base station 12 indicates to DCS 12 to begin routing the data when the after the future SCH has been set up. If there is a change in the data rate, there would exist contention for the SCH resources between the existing SCH and the future SCH. Accordingly, in step 270, base station 12 indicates to DCS 12 to begin routing the data at time $T_{D/R}$ after the current data burst is completed.

Returning to step 120, if there are no SCH resources supporting existing SCHs in the OA state, flowchart 100 proceeds to step 140 in which base station 12 determines whether there are other SCH resources available to set up a SCH for the user associated with the received DNR. If there are other such SCH resources available, in step 150, base station 12 assigns the available SCH resources to support a future SCH for the user, including deleting any old supplemental record for the available SCH resources, creating a new supplemental record for the available SCH resources, setting up a SCH using the available SCH resources, directing DCS 14 to issue a current user next data notify request for the user, if any, in the next PUA window associated with the SCH resources, and directing DCS 14 to begin routing the data at some time $T_s$ or thereafter in the future.

If there are no SCH resources available to support another SCH, in step 160, base station 12 determines if any SCH resources supporting an existing SCH is in the OW state. If such SCH resources exist, in step 170, base station 12 indicates to DCS 14 to issue a waiting user DNR, if any, for the user in one of the next WUA windows associated with SCH resources supporting an existing SCH in the OW state, and to increment the waiting user count for that WUA window by one. The particular WUA window in which DCS 14 is scheduled to issue the waiting user DNR depends on the number of existing SCHs being supported by SCH resources in the OW state, waiting user count and age of the OW states. If there is only one such existing SCH, base station 12 indicates to DCS 14 to issue the waiting user DNR in the WUA window of the associated SCH resources. If there are more than one such existing SCHs, base station 12 indicates to DCS 14 to issue the waiting user DNR in the WUA window of the existing SCH supported by SCH resources in the OW state with the lowest waiting user count. If there are more than one such existing SCHs with the lowest waiting user count, base station 12 indicates to DCS 14 to issue the waiting user DNR in the WUA window of the oldest existing SCH supported by SCH resources in the OW state, as indicated by the supplemental record. Alternately, the particular WUA window in which DCS 14 is scheduled to issue the waiting user DNR may be based on some other criteria or randomness.

If there are no SCH resources supporting an existing SCH in the OW state, in step 180, base station 12 indicates to DCS 14 to issue the next data notify request for the user, if any, at some time in the distant future, e.g., anytime after the termination of the data burst over the future SCH to which currently unavailable resources had been prospectively assigned. Alternately, base station 12 responds with a denial without indicating when DCS 14 may issue a next DNR for the user. In this alternate embodiment, DCS 14 may decide when to issue the next DNR, e.g., after a predetermined waiting period.

Figure 6:
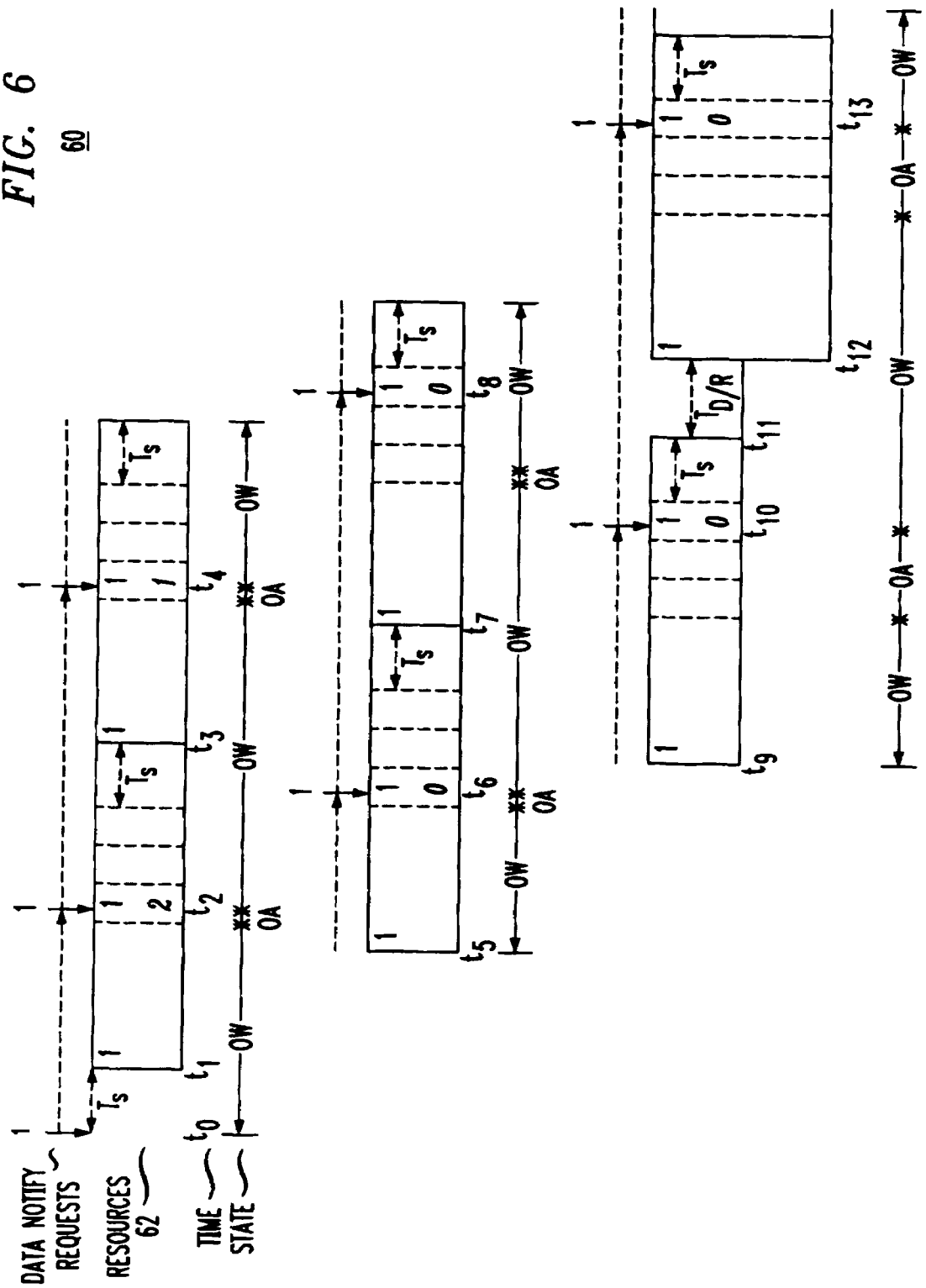
FIG. 6 depicts the application of the flow charts of FIGS. 4 and 5 with respect to a single user and SCH resources supporting a single SCH.
Figure 7:
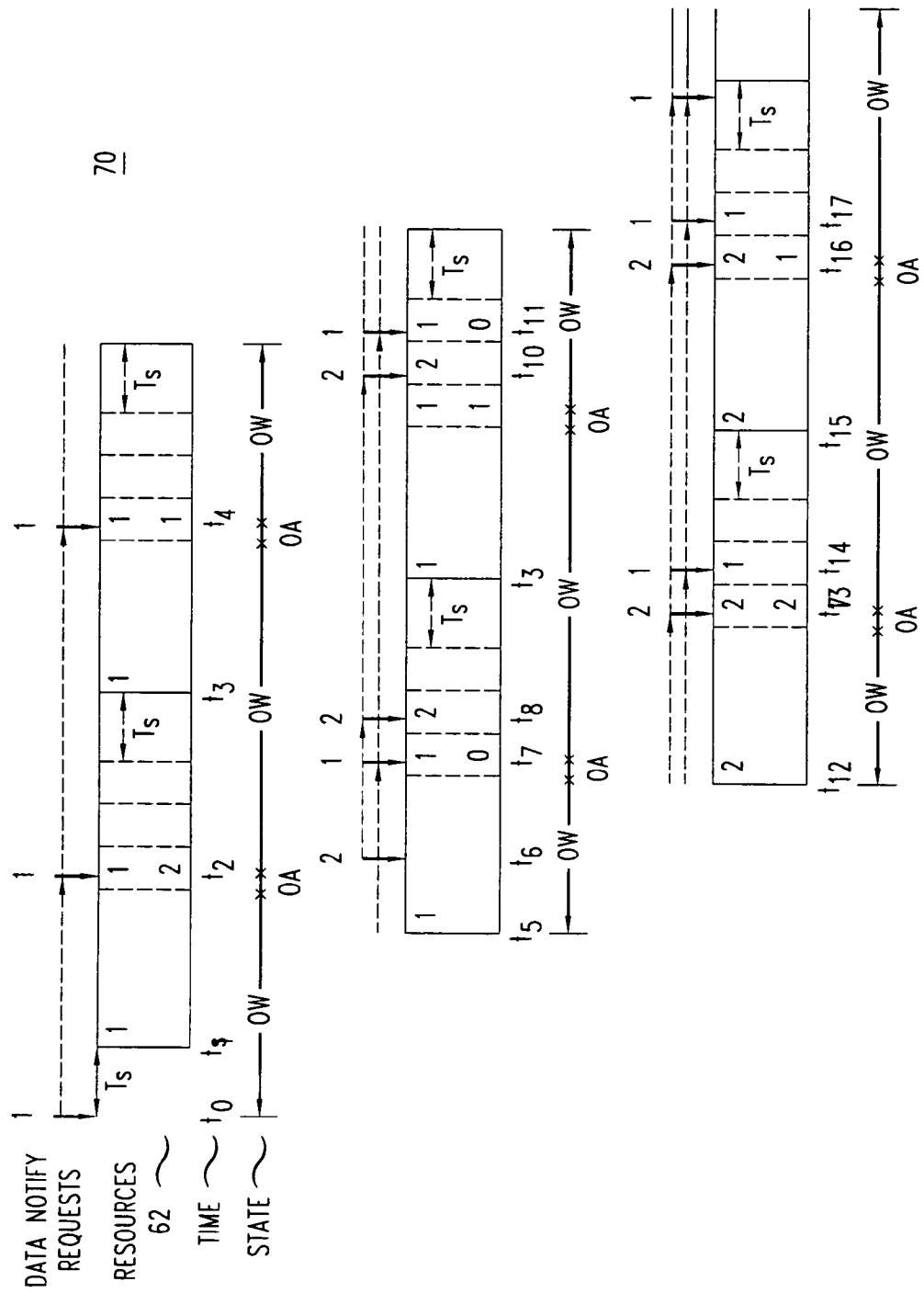
FIG. 7 depicts the application of the flow charts of FIGS. 4 and 5 with respect to two users and SCH resources supporting a single SCH at a time.
Figure 8:
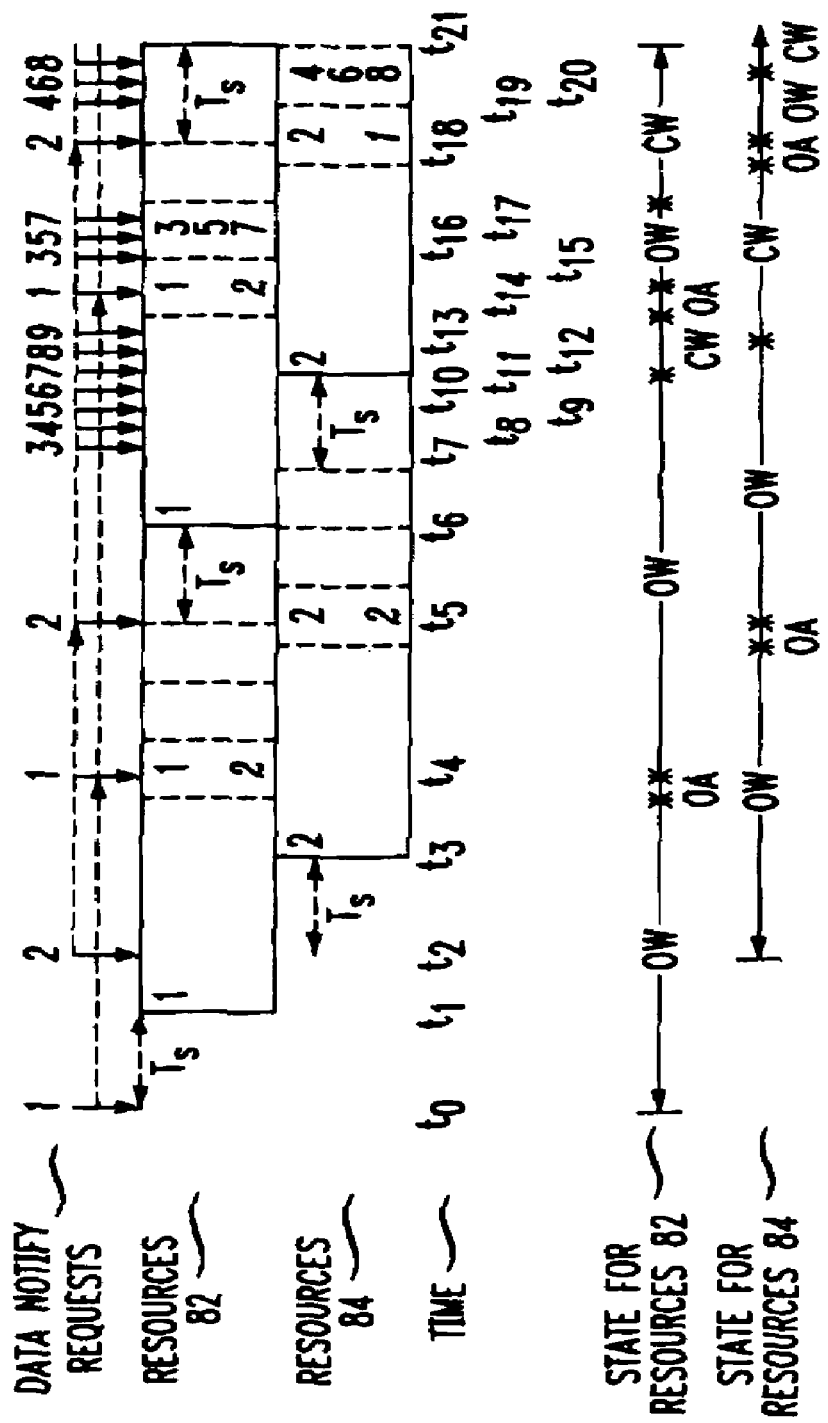
FIG. 8 depicts the application of the flow charts of FIGS. 4 and 5 with respect to a nine users and SCH resources supporting a two SCHs concurrently.
Figure 8B:
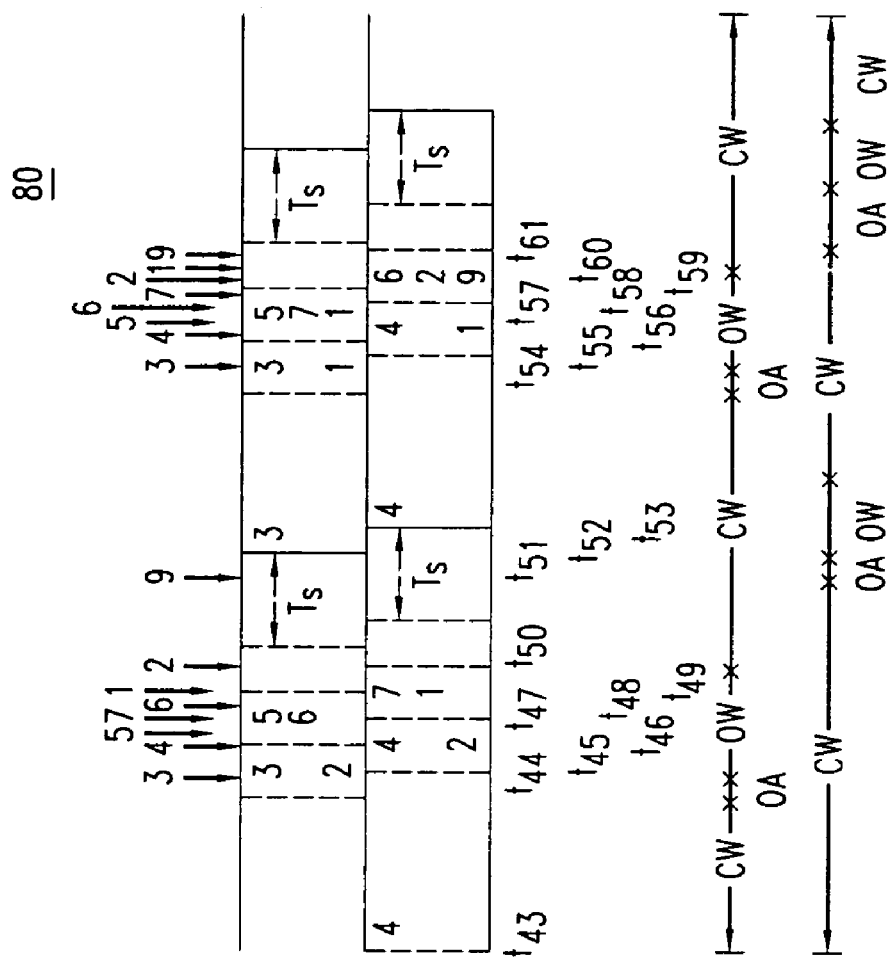

FIGS. 6, 7 and 8 depict examples 60, 70 and 80 illustrating the application of the present invention in different scenarios. For simplicity sake, the examples will be described with reference to the above described flowcharts 100 and 200. It should be assumed that the examples are executed in accordance with the supplemental channel sharing algorithm depicted in the flowcharts. In some instances, specific parts of the algorithm may be emphasized during the examples to make a point. However, this should not be construed to limit the present invention in any manner.

Example 60 of FIG. 6 illustrates the application of the present invention with respect to a single user and SCH resources 62 supporting a single SCH. At time $t_0$, a data notify request for user one is received by base station 12 (as indicated by the downward pointing arrow). User one is a random user at time $t_0$. At time $t_0$, there are no SCH in the OA state but SCH resources 62 is available. Thus, the SCH resources 62 is assigned to user one in accordance with step 150, including creating a new supplemental record having a continuation count of three and indicating to DCS 14 to issue a current user DNR in the next PUA window of SCH resources 62. Note that once SCH resources 62 is assigned to user one, SCH resources 62 enter the OW state.

From time $t_0$ to $t_1$, a SCH is set up for user one. At time $t_1$, DCS 14 begins routing data for user one (as indicated by the numeric one). User one is now a current user at time $t_1$. At time $t_2$, user one still has enough data over the threshold amount to transmit and DCS 14 issues a current user DNR in the PUA window. Unless otherwise stated, future SCHs are assumed to have a data rate identical to the data rate of the existing SCHs.

Since SCH resources 62 is in the OA state when the current user DNR was issued, SCH resources 62 is prospectively assigned (or granted a continuation) to user one in accordance with step 130 with respect to a current user, including reducing the continuation count by one (from three to two). Note that the numbers in the top and bottom rows at time $t_2$ indicates the user associated with the received DNR in the PUA window and the continuation count for such user, respectively.

At time $t_3$, DCS 14 begins to route the data associated with the current user DNR issued at time $t_2$ for user one. At time $t_4$, another current user DNR is issued for user one in the PUA window while SCH resources 62 is in the OA state. SCH resources 62 is prospectively assigned to user one in accordance with step 130, including reducing the continuation count from two to one. At time $t_5$, DCS 14 begins to route the data associated with the current user DNR issued at time $t_4$ for user one.

At time $t_6$, another current DNR is issued for user one in the PUA window while SCH resources 62 is in the OA state. The SCH resources are prospectively assigned to user one in accordance with step 130, including reducing the continuation count from one to zero and indicating to DCS 14 to issue a current user DNR in the next ERA window since the continuation count is now zero.

At time $t_7$, DCS 14 begins to route the data associated with the DNR issued at time $t_6$ for user one. At time $t_8$, a current user DNR is issued for user one in the ERA window while SCH resources 62 is in the OA state. Note that SCH resources 62 remain in the OA state for a longer period of time because no DNR was received prior to the ERA window. SCH resources 62 is prospectively assigned to user one in accordance with step 130, including indicating to DCS 14 to issue the current user DNR in the next ERA window. Note that the continuation count was not reduced this time because it is currently at its lowest value, i.e., 0. At time $t_9$, DCS 14 begins to route the data associated with the DNR issued at time $t_8$ for user one.

At time $t_{10}$, another current user DNR is issued for user one in the ERA window while SCH resources 62 is in the OA state. This DNR, however, is associated with a future SCH having a higher data rate than the data rate of the existing SCH. The SCH resources are prospectively assigned to user one in accordance with step 130, including indicating to DCS 14 to begin routing the data at time $t_{12}$ (and not at time $t_{11}$) in order to allow for a new higher data rate SCH to be set up in the presence of resource contention. Thus, there is a gap between time $t_{11}$ and $t_{12}$ corresponding to time $T_{D/R}$ for deactivating the existing SCH and setting up the higher data rate future SCH.

At time $t_{12}$, DCS 14 begins to route the data associated with the DNR issued at time $t_{10}$ for user one for transmission over the higher data rate SCH. At time $t_{13}$, another current user DNR is issued for user one in the ERA window while SCH resources 62 is in the OA state. The SCH resources are prospectively assigned to user one in accordance with step 130.

Example 70 of FIG. 7 illustrates the application of the present invention with respect to two users and SCH resources 72 supporting a single SCH at a time. With respect to user one, the events occurring at times $t_0$ to $t_5$ in example 70 are handled in the same manner as the corresponding events occurring at times $t_0$ to $t_5$ in example 60. At time $t_6$, a DNR is issued for user two, who is a random user. At this time, SCH resources 72 is in the OW state. Thus, SCH resources 72 is not assigned to user two and DCS 14 is instructed to issue a waiting user DNR for user two in the next WUA window in accordance with step 170. User two becomes a waiting user.

At time $t_7$, a current user DNR is issued for user one in the PUA window while SCH resources 72 is in the OA state. SCH resources 72 is prospectively assigned to user one in accordance with step 130, including reducing the continuation count from one to zero and indicating to DCS 14 to issue the current user DNR in the next ERA window since the continuation count is now zero. At time $t_8$, the waiting user DNR is issued for user two in the WUA window while SCH resources 72 is in the OA state. A response to the waiting user DNR is provided in accordance with step 170, including scheduling the waiting user DNR for user two to be issued in the next WUA window (as indicated by the numeric two in the WUA window).

At time $t_9$, DCS 14 begins routing data associated with the DNR issued for user one at time $t_7$. At time $t_{10}$, another waiting user DNR is issued for user two in the WUA window while SCH resources 72 is in the OA state. SCH resources 72 is prospectively assigned to user two in accordance with step 130 for a new user, including creating a new supplemental record and deleting the old supplemental record. Note that there is no contention between the existing SCH for user one and the future SCH for user two At time $t_{11}$, a current user DNR is issued for user one in the ERA window while SCH resources 72 is in the OW state. The response to the current user DNR for user one is provided in accordance with step 170, including instructing DCS 14 to issue a current user DNR for user one in the next WUA window. User one becomes a waiting user.

At time $t_{12}$, DCS 14 begins routing data associated with the DNR issued for user two at time $t_{10}$. User two becomes a current user At time $t_{13}$, user two still has enough data over the threshold amount to transmit and DCS 14 issues a current user DNR for user two during the next PUA window while SCH resources 72 is in OA state. Thus, SCH resources 72 is prospectively assigned to user two in accordance with step 130 for a current user.

At time $t_{14}$, the waiting user DNR is issued for user one in the WUA window while SCH resources 72 is in the OW state. The response to this DNR for user one is provided in accordance with step 170. At time $t_{15}$, DCS 14 begins routing data associated with the DNR issued for user two at time $t_{13}$. At time $t_{16}$, another current user DNR for user two is issued during the PUA window while SCH resources 72 is in the OA state. Thus, SCH resources 72 is prospectively assigned to user two in accordance with step 130. At time $t_{17}$, the waiting user DNR is issued for user one in the WUA window while SCH resources 72 is in the OW state. The response to this DNR for user one is provided in accordance with step 170.

Example 80 of FIG. 8 illustrates the application of the present invention with respect to nine users and SCH resources 82, 84 for supporting two SCHs concurrently. At time $t_0$, a DNR for user one is issued. User one is a random user. There are no SCH resources in the OA state and SCH resources 82 and 84 are available to support a SCH for user one. In accordance with step 150, a SCH for user one is set up using SCH resources 82 during time period $t_0$ to $t_1$. Note that SCH resources 84 could have been assigned to user one instead of SCH resources 82. At $t_1$, DCS 14 begins routing data for user one for transmission using SCH resources 82. User one becomes a current user. At time $t_2$, a DNR for user two is issued. User two is a random user. There are no SCH resources in the OA state but SCH resources 84 are available to support a SCH for user two (and SCH resources 82 is in the OW state). Thus, in accordance with step 150, a SCH for user two is set up using SCH resources 84 during time period $t_2$ to $t_3$. At $t_3$, DCS 14 begins routing data for user two for transmission using SCH resources 84. User two becomes a current user.

At time $t_4$, a current user DNR for user one is issued during the PUA window of SCH resources 82 while SCH resources 82 is in the OA state. A continuation for SCH resources 82 is prospectively assigned to user one in accordance with step 130. At time $t_5$, a current user DNR for user two is issued during the PUA window of SCH resources 85 while SCH resources 84 is in the OA state. A continuation for SCH resources 84 is prospectively assigned to user two in accordance with step 130. At time $t_6$, DCS 14 begins routing data for user one for transmission using SCH resources 82.

From time $t_7$ to $t_{13}$, DNRs for users three through nine are respectively received. Users three through nine are random users. DNRs for users three through seven are received during the OW state of both SCH resources 82 and 84. Users three through seven become waiting users. Responses to these DNRs are provided in accordance with step 170. Specifically, waiting user DNRs for users three through seven are alternately scheduled to be issued in the next WUAs of SCH resources 82 and 84, respectively. In other words, waiting user DNRs for users three, five and seven are scheduled to be issued in the next WUA window of SCH resources 82, whereas waiting user DNRs for users four and six are scheduled to be issued in the next WUA window of SCH resources 84. Note that, in this example, the first waiting user DNR, i.e., DNR for user three, is assigned to the next WUA for SCH resources 82 because it is supporting the oldest SCH, and the maximum number of waiting users is three. As each of the users are scheduled to a next WUA window, the waiting user count associated with the WUA window to which the user is scheduled is incremented by one.

In one embodiment, when there are multiple waiting users DNRs scheduled to be issued in one WUA window, the waiting user DNRs are scheduled to be issued in the WUA window according to priority of when the associated previous DNR was received. For example, since the DNR for user three was received before the DNRs for users five and seven, the waiting user DNR for user three will be scheduled to be issued in the next WUA window before the waiting user DNRs for users five and seven.

At time $t_{11}$, with respect to SCH resources 82, the OW state terminates and the CW state begins when the waiting user DNR for user seven is scheduled for issuance in the next WUA window. Thus, upon completion of step 170 at time $t_{11}$, the waiting user count for SCH resources 82 and 84 are three and two, respectively. Note that at time $t_{11}$, DCS 14 begins routing data for user two for transmission using SCH resources 84.

At time $t_{12}$, the DNR for user eight is received in the OW and CW states for SCH resources 84 and 82, respectively. In accordance with step 170, a waiting user DNR for user eight is scheduled to be issued in the next WUA of SCH resources 84. User eight becomes a waiting user. Additionally, with respect to SCH resources 84, the OW state terminates and the CW state begins when the waiting user DNR for user eight is scheduled for issuance in the next WUA window. At time $t_{13}$, both SCH resources 82 and 84 are in the CW state when DNR for user nine is issued. In accordance with step 180, the next DNR for user nine is scheduled to be issued at some time in the distant future, i.e., $t_{51}$.

At time $t_{14}$, the current user DNR for user one is received in the PUA window of SCH resources 82 while SCH resources 82 is in OA state. The response to this DNR is handled in accordance with step 130. At times $t_{15}$ to $t_{17}$, DNRs for users three, five and seven are received in the WUA window of SCH resources 82 while SCH resources 82 and 84 are in OW and CW states, respectively. In accordance with step 170, waiting user DNRs for users three, five and seven are scheduled to be issued in the next WUA of SCH resources 82.

At time $t_{18}$, a DNR for user two is received in the PUA window of SCH resources 84 while SCH resources 84 and 82 are in OA and CW states, respectively. The response to this DNR is handled in accordance with step 130. At times $t_{19}$ to $t_{21}$, DNRs for users four, six and eight are received in the WUA window of SCH resources 84 while SCH resources 84 is in OW state. In accordance with step 170, waiting user DNRs for users four, six and eight are scheduled to be issued in the next WUA of SCH resources 84. Note that SCH resources 82 is in the CW state. At times $t_{22}$ and $t_{23}$, DCS 14 begins routing data for user one and two for transmission using SCH resources 82 and 84, respectively.

From time $t_{24}$ to $t_{31}$, DNRs are received for users one through eight. The manner in which these DNRs are handled is similar to the manner in which DNRs received during times $t_{14}$ to $t_{21}$ except that the current user DNRs for users one and two are scheduled to be issued in the next ERA window of SCH resources 82 and 84, respectively, because their associated continuation counts were set to zero as a result of the continuations granted in accordance with step 130 at times $t_{14}$ and $t_{18}$. At times $t_{32}$ and $t_{33}$, DCS 14 begins routing data for user one and two for transmission using SCH resources 82 and 84, respectively.

At time $t_{34}$, a waiting user DNR for user three is received in the WUA window of SCH resources 82 while SCH resources 82 is in the OA state. The response to this DNR is handled accordingly by step 130, including scheduling DCS 14 to begin routing data for user three a time $T_{D/R}$ after termination of the existing SCH supported by SCH resources 82, creating a new supplemental record and deleting any old supplemental record for SCH resources 82. Note that there exist contention for SCH resources 82 between the existing SCH for user one and the future SCH for user three. At times $t_{35}$ and $t_{36}$, DNRs for users five and seven are received in the WUA window of SCH resources 82 while SCH resources 82 and 84 are in the OW and CW states. In accordance with step 170, waiting user DNRs for users five and seven are scheduled to be issued in the next WUA of SCH resources 82. At time $t_{37}$, a DNR for user one is received in the ERA window of SCH resources 82 while SCH resources 82 is in the OW state. In accordance with step 170, a waiting user DNR for user one is scheduled to be issued in the next WUA of SCH resources 82. Note that user one is now a waiting user and, thus, the next DNR for user one is not scheduled to be issued in the next ERA of SCH resources 82.

At time $t_{38}$, a waiting user DNR for user four is received in the WUA window of SCH resources 84 while SCH resources 84 is in the OA state. The response to this DNR is handled in accordance with step 130, including prospectively assigning SCH resources 84 to user four. Note that no contention for SCH resources 84 exist between the existing SCH for user two and the future SCH for user four.

At times $t_{39}$ and $t_{40}$, waiting user DNRs for users six and eight are received in the WUA window of SCH resources 84 while SCH resources 84 is in the OW state. In accordance with step 170, the waiting user DNRs for users six and eight are scheduled to be issued in the next WUA of SCH resources 84. Note that SCH resources 82 is in the CW state. At time $t_{41}$, a current user DNR for user two is received in the ERA window of SCH resources 84 while SCH resources 84 is in the OW state. In accordance with step 170, a waiting user DNR for user two is scheduled to be issued in the next WUA of SCH resources 84. User two becomes a waiting user. At times $t_{42}$ and $t_{43}$, DCS 14 begins routing data for user three and four for transmission using SCH resources, respectively, and users three and four become current users.

At time $t_{44}$, a current user DNR for user three is issued in the PUA window of SCH resources 82 while SCH resources 82 and 84 are in the OA and CW states, respectively. Thus, SCH resources 82 are prospectively assigned to user three in accordance with step 130. At time $t_{45}$, a current user DNR for user four is issued in the PUA window of SCH resources 84 while SCH resources 84 and 82 are in the OA and OW states. Thus, SCH resources 84 are prospectively assigned to user four in accordance with step 130.

From time $t_{46}$ through $t_{50}$ when SCH resources 82 and 84 are both in the OW state, DNRs for users five, seven, six, one and two are issued. Specifically, the waiting user DNRs for user five and seven are issued in the WUA window of SCH resources 82 but the PUA window of SCH resources 84; the waiting user DNRs for users six and one are issued in the WUA windows of both SCH resources 82 and 84; and waiting user DNR for user two is issued in the ERA and WUA windows of SCH resources 82 and 84, respectively. Accordingly, users five, seven, six, one and two are alternately scheduled to be issued in the next WUA windows of SCH resources 82 and 84, respectively. SCH resources 82 goes into the CW state after time $t_{50}$.

Note that the waiting user DNR for user eight was not issued in the WUA window of SCH resources 84 although it had been scheduled to be issued at in that WUA window at time $t_{44}$. The reason the waiting user DNR for user eight was not issued is because, on or about at time $t_{49}$ (when the waiting user DNR for user eight should had been issued), data for user eight, if any, was not over the data threshold.

At time $t_{51}$, a DNR for user nine is issued while SCH resources 84 is in the OW state (but SCH resources 82 is in the CW state). Accordingly, a response to the DNR is handled in accordance with step 170. User nine becomes a waiting user. At times $t_{52}$ and $t_{53}$, data for users three and four are routed by DCS 14 for transmission using SCH resources 82 and 84, respectively.

At time $t_{54}$, a current user DNR for user three is issued in the PUA window of SCH resources 82 while SCH resources 82 and 84 are in the OA and CW states, respectively. Thus, SCH resources 82 are prospectively assigned to user three in accordance with step 130. At time $t_{55}$, a current user DNR for user four is issued in the PUA window of SCH resources 84 while SCH resources 84 and 82 are in the OA and OW states. Thus, SCH resources 84 are prospectively assigned to user four in accordance with step 130.

From time $t_{56}$ through $t_{60}$ when SCH resources 82 and 84 are both in the OW state, waiting user DNRs for users five, six, seven, two and one are issued. Specifically, the waiting user DNRs for user five and six are issued in the WUA window of SCH resources 82 but the PUA window of SCH resources 84; the waiting user DNRs for users seven and two are issued in the WUA windows of both SCH resources 82 and 84; and waiting user DNR for user one is issued in the ERA and WUA windows of SCH resources 82 and 84, respectively. Accordingly, waiting user DNRs for users five, seven and one are scheduled to be issued in the next WUA windows of SCH resources 82, and waiting user DNRs for users six and two are scheduled to be issued in the next WUA windows of SCH resources 84.

At time $t_{61}$, a waiting user DNR for user nine is issued in the WUA window of SCH resources 84 while SCH resources 84 and 82 are in the OW and CW states, respectively. Accordingly, in accordance with step 170, a waiting user DNR for user nine is scheduled to be issued in the next WUA window for SCH resources 84.

Although the present invention has been described in considerable detail with reference to certain embodiments, other versions are possible. For example, the number of request windows may be different; the request windows may be used different to take into account different user quality of service priorities; the present invention may operate with or without continuation count thresholds, user priorities and re-assignments to different data rates; the availability of SCH resources can be based on the time $T_s$ in the future, e.g., SCH resources may be considered currently available although it is currently supporting an existing SCH but will be completed with the data burst transmission over the existing SCH no later than the time $T_s$ in the future; and the OA state may terminate no later than at the end of the ERA window. Therefore, the spirit and scope of the present invention should not be limited to the description of the embodiments contained herein.

We claim:

1. A method of sharing supplemental channel resources in a system utilizing open assignment and open waiting states for responding to a resource request, the method comprising the steps of:

receiving a data notify request indicating a request for supplemental channel resources; and prospectively assigning currently unavailable supplemental channel resources to support a future supplemental channel for a user associated with the received data notify request if the data notify request was received during an open assignment state during which the currently unavailable supplemental channel resources are available for prospective assignment.

2. The method of claim 1 comprising the additional step of:

determining whether other supplemental channel resources are available if the data notify request was not received during the open assignment state.

3. The method of claim 2 comprising the additional step of:

assigning the other supplemental channel resources to the user if the other supplemental channel resources are available.

4. The method of claim 3, wherein the step of assigning the other supplemental channel resources comprises the step of:

scheduling a next data notify request to be issued for the user in a next preferred user assignment window associated with the other supplemental channel resources, the preferred user assignment window corresponding to a time period during which a current user may be scheduled to issue a data notify request.

5. The method of claim 2 comprising the additional step of:

determining whether the currently unavailable supplemental channel resources are in an open waiting state during which the currently unavailable supplemental channel resources are not available for prospective assignment.

6. The method of claim 5 comprising the additional step of:

scheduling a next data notify request for the user in a next waiting user assignment window associated with the currently unavailable supplemental channel resources if the currently unavailable supplemental channel resources are in the open waiting state, the waiting user assignment window corresponding to a time period during which a waiting user may be scheduled to issue a data notify request.

7. The method of claim 5 comprising the additional step of:

scheduling a next data notify request for the user to be issued if the currently unavailable supplemental channel resources are not in the open waiting state.

8. The method of claim 1, wherein the step of prospectively assigning the currently unavailable supplemental channel resources comprises the step of:

determining whether the user is a current user of supplemental channel resources.

9. The method of claim 8, wherein the step of prospectively assigning the currently unavailable supplemental channel resources comprises the additional steps of:

reducing a continuation count for the user if the user is a current user; and scheduling when to issue a next data notify request for the user based on the continuation count.

10. The method of claim 8, wherein the step of prospectively assigning the currently unavailable supplemental channel resources comprises the additional step of:

determining if a first data rate is different from a second data rate, the first data rate being associated with the currently unavailable supplemental channel resources, the second data rate being associated with the future supplemental channel.

* * * * *